UNITED STATES PATENT OFFICE.

CARL ALFRED BRAUN, OF MUNICH, GERMANY, ASSIGNOR TO HILDEGARD MARIE LACHMANN, RUDOLF GEORG LACHMANN, AND GERHARD HANS LACHMANN, ALL OF BERLIN, GERMANY.

PROCESS OF PRODUCING CELLULOSE.

1,387,441.  Specification of Letters Patent.  Patented Aug. 9, 1921.

No Drawing.  Application filed April 1, 1920. Serial No. 370,603.

*To all whom it may concern:*

Be it known that I, CARL ALFRED BRAUN, a citizen of the German Empire, residing at Munich, Germany, have invented certain new and useful Improvements in Processes of Producing Cellulose, for which I have filed applications in Germany, Aug. 6, 1916, and May 30, 1918, and of which the following is a specification.

My invention refers to cellulose and more especially to a process of producing cellulose from highly lignified plants such as jute, Manila hemp, reed, typha, nettle, ordinary wood, a. s. o. Its particular object is a method of treating such materials which results in turning them into a cellulose of superior qualities.

In testing the sulfite lyes used in the production of cellulose it has been ascertained that they always contain varying although small quantities of sodium sulfite, and experience has shown that this sodium sulfite has a favorable effect on the process as well as on the product obtained. One has further succeeded in producing from plants lignified to a lower degree a cellulose showing an extraordinary preservation of the fiber by treating them only with sodium sulfite solutions under an increased pressure of 6 to 8 atmospheres. However Dr. Klein has shown (on page 426 of Schwalbe's *"Chemie der Cellulose"*) that this method is frequently accompanied by considerable secretions of sulfur.

Schacht has further shown how to apply greater quantities of sodium sulfite in highly caustic sodium lyes. The products made after this method presented extraordinary qualities and a great preservation of the fiber.

With the process forming the primary object of my invention these advantages are obtained in an even more perfect manner, the use of highly caustic alkali lyes being avoided altogether.

The novel process by which in accordance with the plants treated full- and half-cellulose as well as fibers fit to be spun are obtained, substantially consists in heating the raw material or boiling it under increased pressure with a solution containing, in accordance with the result to be attained, varying quantities of loosely combined alkali such as sodium carbonate or alkali metal soap and sodium sulfite as well as alkali sulfids such as sodium sulfid.

The following are examples of applying my novel method to the treatment of different raw materials:

I. 100 kilos of wood comminuted and prepared as usual in the manufacture of cellulose are treated in a boiler under increased pressure and at temperatures up to 150 degr. C. with 500 liters of a solution containing 50 kilos $Na_2SO_3$ and 8 kilos $Na_2S$. The liquid is boiled down until its computed content of $SO_2$ is still 0.4 to 0.5 per cent., this being the case after about six hours. The highly pulpy mass which can easily be broken and macerated, represents a half-cellulose of light yellow color and greatest strength of the fibers surpassing even that of strong cellulose. With phloroglucin a slight red coloring of this product is obtained.

II. 100 kilos of straw, typha or reed in comminuted condition are boiled in a boiler under increased pressure at temperatures up to 150 degr. C. with a solution containing 25 kilos $Na_2SO_3$ and 7 kilos $Na_2S$ in 700 liters of water. The liquid being boiled down to 0.2 per cent. $SO_2$, the product resulting therefrom is a cellulose showing no wood reaction. The fiber is preserved to the highest degree and may be bleached with 14 per cent. chlorid of lime to a high grade white.

III. 100 kilos of jute are treated during 4 hours in a boiler at low pressure and at temperatures not exceeding 135 degr. C. with 15 kilos soap or 10 kilos $Na_2CO_3$ and 5 kilos $Na_2S$ dissolved in 700 liters of water. There results a paper half-stuff which may be bleached a high grade white with no more than 20 per cent. chlorid of lime.

In producing cellulose and textile fibers from raw plants in the manner described a number of these plants such as nettle, flax and others on leaving the boiler show a green color which appears to be caused by chlorophyl and its products and may be removed to the greater part by thorough rinsing which however not only requires great quantities of water and much time but also causes a considerable loss of valuable fibers. I have now ascertained that these green pigments may be decomposed completely during the boiling without the fibers being injured, if such quantities of caustic alkali are added to the liquid, as are just sufficient to destroy the pigments. I therefore prefer proceeding as follows:

100 kilos of comminuted raw plants such as nettle are placed into the boiler and a watery solution of 25 kilos $Na_2SO_3$ (sodium sulfite), 5.5 kilos $Na_2S$ (sodium sulfid) and 2.5 kilos NaOH (caustic soda) in 700 liters of water are added, the whole being boiled during 4 hours under high pressure at temperatures not exceeding 135 degr. C.

From the stems of the nettle thus treated the outer bast-fibers can easily be detached and after having been rinsed carefully may be bleached to a high-grade white with about 12 per cent. chlorid of lime. The fiber shows a high silk-like luster, a strength far surpassing that of flax fiber and a pure white color.

The ligneous part of the stem can be ground and furnishes a cellulose-like material.

Although sodium sulfid is employed the molestations caused by offensive smell in boiling are less than with the sulfate process.

The regeneration of the salts is effected in a well known manner.

I claim:—

1. The process which consists in heating vegetable matter with a watery solution of an alkali sulfite and an alkali sulfid.

2. The process which consists in heating vegetable matter with a watery solution of an alkali sulfite, an alkali sulfid and a loosely combined alkali.

3. The process which consists in heating vegetable matter with a watery solution of an alkali sulfite, an alkali sulfid and an alkali carbonate.

4. The process which consists in boiling under increased pressure vegetable matter with a watery solution of an alkali sulfite and an alkali sulfid.

5. The process which consists in boiling under increased pressure vegetable matter with a watery solution of an alkali sulfite, an alkali sulfid and a loosely combined alkali.

6. The process which consists in boiling under increased pressure vegetable matter with a watery solution of an alkali sulfite, an alkali sulfid and an alkali carbonate.

7. The process which consists in heating vegetable matter with a watery solution of an alkali sulfite, an alkali sulfid and a small quantity of a caustic alkali.

8. The process which consists in heating vegetable matter with a watery solution of an alkali sulfite, an alkali sulfid, a loosely combined alkali and a small quantity of a caustic alkali.

In testimony whereof I affix my signature.

CARL ALFRED BRAUN.